(12) United States Patent
Gardner et al.

(10) Patent No.: US 8,687,683 B2
(45) Date of Patent: Apr. 1, 2014

(54) METHOD OF OPTIMIZING FLOATING DFE RECEIVER TAPS

(75) Inventors: John D. Gardner, Colorado Springs, CO (US); Gabriel L. Romero, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 377 days.

(21) Appl. No.: 13/302,691

(22) Filed: Nov. 22, 2011

(65) Prior Publication Data

US 2013/0128946 A1 May 23, 2013

(51) Int. Cl.
*H03H 7/30* (2006.01)

(52) U.S. Cl.
USPC .......................................................... 375/233

(58) Field of Classification Search
CPC ........... H03H 7/30; H03H 7/40; G11C 27/04; H04J 14/00; H03K 5/159; H04L 27/01
USPC .............. 333/18, 28; 375/229, 230, 231, 233, 375/234, 316, 342, 343, 347, 348; 714/786, 714/795
See application file for complete search history.

(56) References Cited

U.S. PATENT DOCUMENTS

| | | | | |
|---|---|---|---|---|
| 7,668,238 B1 * | 2/2010 | Rokhsaz | ........................ | 375/233 |
| 8,391,350 B2 * | 3/2013 | Chan et al. | ..................... | 375/233 |
| 2005/0180498 A1 * | 8/2005 | Bhakta et al. | ................. | 375/233 |
| 2009/0016422 A1 | 1/2009 | Zhong et al. | | |
| 2009/0086808 A1 * | 4/2009 | Liu et al. | ........................ | 375/233 |
| 2009/0252212 A1 | 10/2009 | Risk et al. | | |
| 2010/0177816 A1 * | 7/2010 | Malipatil et al. | ............... | 375/233 |
| 2010/0284686 A1 * | 11/2010 | Zhong | ................................ | 398/1 |
| 2011/0125439 A1 * | 5/2011 | Guruprasad | .................... | 702/79 |
| 2011/0142120 A1 | 6/2011 | Liu et al. | | |

OTHER PUBLICATIONS

D. Garrett, "A Low Power Normalized-LMS Decision Feedback Equalizer for a Wireless Packet Modem" 2002.*

* cited by examiner

*Primary Examiner* — Sam K Ahn
*Assistant Examiner* — Shawkat M Ali
(74) *Attorney, Agent, or Firm* — Suiter Swantz pc llo

(57) ABSTRACT

A method for determining floating tap positions in a DFE of a receiver is disclosed. The method include providing a group of floating taps for the DFE; obtaining a baseline eye opening value for the receiver when the group of floating taps is disabled; providing a plurality of floating tap distribution configurations, each specifying a distribution configuration for the group of floating taps within the DFE; obtaining a plurality of eye opening values for the receiver, each particular eye opening value corresponding to a particular floating tap distribution configuration when the group of floating taps are distributed within the DFE according to the particular floating tap distribution configuration; comparing each of the plurality of eye opening values against the baseline eye opening value; and identifying an optimal floating tap distribution configuration based on the comparison of each of the plurality of eye opening values against the baseline eye opening value.

12 Claims, 2 Drawing Sheets

METHOD OF OPTIMIZING FLOATING DFE RECEIVER TAPS

TECHNICAL FIELD

The present invention relates to the field of communication systems and particularly to a system and method for optimizing floating decision feedback equalizer (DFE) receiver taps.

BACKGROUND

Inter symbol interference (ISI) is a form of distortion of a signal in which one symbol interferes with subsequent symbols. ISI resulting from a communications channel can greatly reduce an eye opening at an input of a receiver. A decision feedback equalizer (DFE) has a number of taps that can be optimized to compensate for the ISI effects of a communications channel. It accomplishes this by approximating the pulse response of the channel.

Some applications contain multiple impedance discontinuities that may cause reflections to show up over a wide range of Unit Intervals (UIs). To compensate for this, a large number of taps may be needed, which may be impractical in certain situations (e.g., constraint by requirements such as power consumptions, space availabilities, costs or the like). Since the effects of reflections may not affect all taps, only some DFE taps may be utilized to selectively target where significant reflections may occur. Floating taps may be utilized for such purposes.

A floating tap is a tap whose tap value and position in time are adjustable. The time position of these floating taps must be located such that they line up in time with the reflections. Determining the optimal position is difficult unless test equipment is available that can accurately measure the reflection propagation times and provide the system designer with enough information to select the proper locations to apply these taps. The test system would need to be instrumented at the input to the receiver so that the reflection delays can be measured. This would have to be instrumented for every channel of every system that the designer wished to apply this feature. This makes it impractical for the system designer or end users. Therein lies a need for a system and method for optimizing floating decision feedback equalizer (DFE) receiver taps.

SUMMARY

Accordingly, an embodiment of the present disclosure is directed to a method for determining floating tap positions in a decision feedback equalizer (DFE) of a receiver. The method may include providing a group of floating taps for the DFE; obtaining a baseline eye opening value for the receiver when the group of floating taps is disabled; providing a plurality of floating tap distribution configurations, each one of the plurality of floating tap distribution configurations specifying a distribution configuration for the group of floating taps within the DFE; obtaining a plurality of eye opening values for the receiver, each particular eye opening value of the plurality of eye opening values corresponding to a particular floating tap distribution configuration of the plurality of floating tap distribution configurations, wherein the particular eye opening value is obtained when the group of floating taps are distributed within the DFE according to the particular floating tap distribution configuration and tap values of the floating taps are optimized for this particular floating tap distribution configuration; comparing each of the plurality of eye opening values against the baseline eye opening value; and identifying an optimal floating tap distribution configuration based on the comparison of each of the plurality of eye opening values against the baseline eye opening value.

The method may further include steps of determining whether there exists a floating tap distribution configuration that provides a largest improvement in eye opening value compare to the baseline eye opening value. If such a floating tap distribution configuration exists, this floating tap distribution configuration may be identified as the optimal floating tap distribution configuration. However, if no such floating tap distribution configuration exists, a none-distribution configuration may be identified as the optimal floating tap distribution configuration, wherein the none-distribution configuration disables the group of floating taps in the DFE.

A further embodiment of the present disclosure is directed to a system for determining floating tap positions in a decision feedback equalizer (DFE) of a receiver. The system may include a database module, an eye diagram analysis module and an evaluation module. The database module may be configured for providing a plurality of distribution configurations for a group of floating taps in the DFE. The eye diagram analysis module may be configured for obtaining a baseline eye opening value for the receiver. The eye diagram analysis module may be further configured for obtaining a plurality of eye opening values for the receiver, each particular eye opening value of the plurality of eye opening values corresponding to a particular distribution configuration of the plurality of distribution configurations, wherein the particular eye opening value is obtained when the group of floating taps are distributed in the DFE according to the particular distribution configuration and tap values of the floating taps are optimized for this particular floating tap distribution configuration. In addition, the evaluation module may be configured for comparing each of the plurality of eye opening values against the baseline eye opening value, and identifying an optimal floating tap distribution configuration based on the comparison of each of the plurality of eye opening values against the baseline eye opening value.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
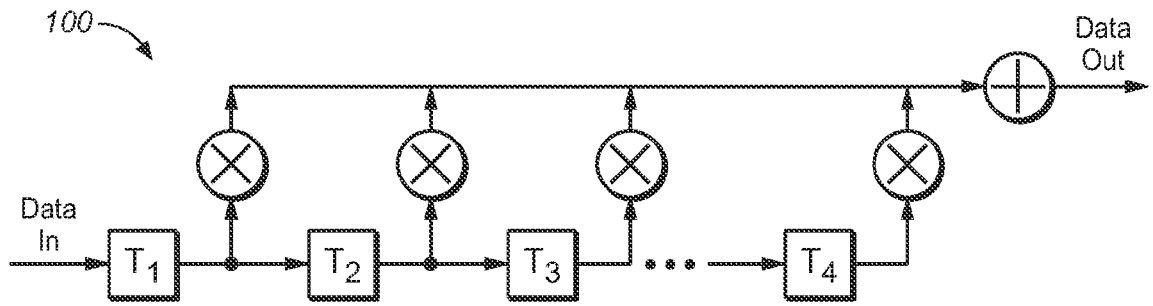
FIG. 1 is a block diagram illustrating a decision feedback equalizer (DFE)

Referring to FIG. 1, a block diagram illustrating a decision feedback equalizer (DFE) 100 is shown. The DFE 100 may be implemented as part of a serializer/deserializer (SerDes)

receiver utilized in a communication system. The DFE 100 may include taps utilized to compensate for ISI effects of a communications channel. Some of these taps may be configured as floating taps (i.e., taps whose tap values and positions in time are adjustable), while others may be configured as fixed taps whose values are adjustable but the time at which they are applied is fixed. The present disclosure is directed to a system and method for determining the optimal positions for such floating taps.

Eye diagrams (also known as eye patterns) are commonly used for evaluating performances of high speed SerDes devices. An eye-diagram is an oscilloscope like display in which a data signal from a receiver is repetitively sampled and applied to the vertical input, or the data record is overlaid such that all transitions are represented in a single view. EYE diagrams are compared by examining their vertical and/or horizontal openings. Generally, the larger the opening in the middle of the eye diagram (may be referred to as the eye opening), the better the signal quality. It is understood that the eye opening may be evaluated based on the horizontal opening, the vertical opening, or the surface area of the open portion of the eye. Various techniques have been developed to provide statistically sampled eye diagram after the application of receiver equalization. The method in accordance with the present disclosure utilizes such post equalization eye diagram measurement techniques to assess the proper location of the floating taps while allowing the normal receiver training to occur.

Figure 2:
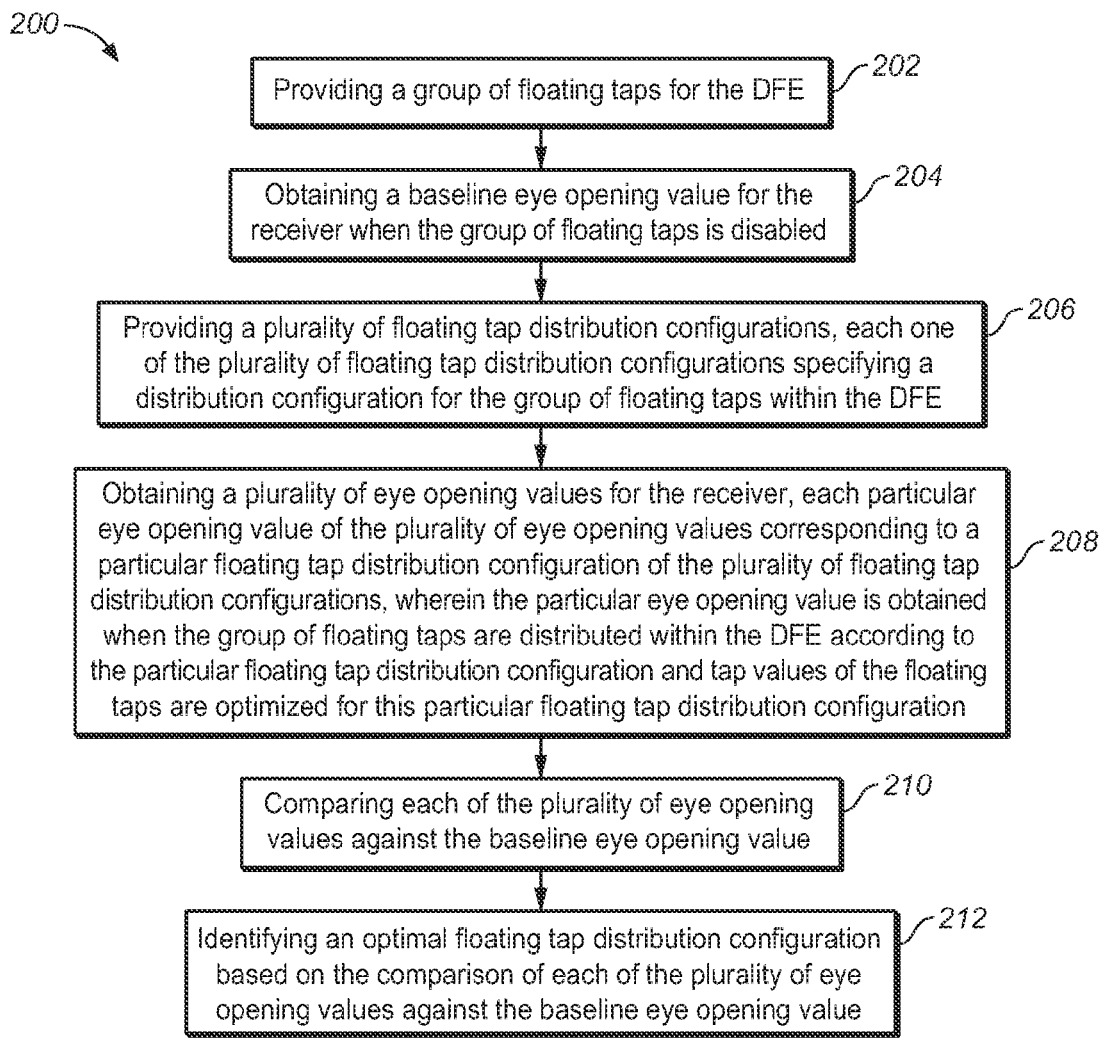
FIG. 2 is a flow chart illustrating a method for optimizing floating tap positions in a DFE.

Referring to FIG. 2, a flow diagram illustrating steps performed by a method 200 for optimizing floating tap positions in a DFE of a receiver is shown. In one embodiment, a group of floating taps for the DFE may be provided in step 202, however, their specific location in which they are applied are yet to be determined. To help determining the optimal positions for these floating taps, a baseline eye opening value with the floating taps disabled may be obtained in step 204 as a reference value.

In one embodiment, step 204 may disable all the floating taps and optimize the values of the fixed taps utilizing a tap value optimization routine (e.g., any existing or yet-to-be-developed routine may be utilized). Step 204 may then obtain the baseline eye opening value for the receiver with the fixed taps applied (while the floating taps still remain disabled). It is contemplated that various techniques may be utilized to obtain the baseline eye opening value without departing from the spirit and scope of the present disclosure.

The remaining steps of the method 200 will determine the optimal positions for these floating taps based on comparisons with the baseline value. In one embodiment, a plurality of floating tap distribution configurations is provided as candidates in step 206. Each one of these distribution configurations may specify a particular distribution configuration (i.e., positions) for the group of floating taps within the DFE for a given time.

For each particular floating tap distribution configuration provided, step 208 may obtain an eye opening value accordingly. For instance, step 208 may pick a first candidate configuration (which specifies the positions in time of the floating taps). The values of these floating taps as well as the fixed tap values may be optimized utilizing any tap value optimization routine (e.g., any existing or yet-to-be-developed routine may be utilized). Subsequently, a first eye diagram may be measured with all the DFE taps applied. Step 208 may then pick a second candidate configuration (which also specifies the positions in time of the floating taps, but may differ from that of the first candidate configuration). Similarly, the values of these floating taps as well as the fixed tap values may be optimized, and a second eye diagram may be measured with all the DFE taps applied.

It is contemplated that the first and second eye diagrams (eye opening values) may be obtained using the same technique utilized for obtaining the baseline eye opening value, therefore no additional changes to the receiver training process is required. It is also contemplated that the number of candidates provided in step 206 is not limited to two, and step 208 may be performed as many times as the number of candidates provided in step 206.

Once the eye opening value corresponding to each of the candidate distribution configurations is obtained, each eye opening value may be compared to the baseline eye opening value in step 210. Step 212 may subsequently identify the optimal distribution configuration based on the comparison results. In one embodiment, the optimal distribution configuration is one of the candidate distribution configurations that provided the largest improvement (e.g., increase) in the eye opening value (in comparison with the baseline value). However, if no improvement is observed, then disabling the floating taps (i.e., a none-distribution configuration) may be deemed as the optimal configuration. That is, enabling the floating taps do not provide any additional benefit in compensating for the ISI effects, and therefore should be disabled to conserve power.

It is contemplated that the eye opening value referenced in the present disclosure may be a numerical representation of the size (e.g., area) of the opening. Alternatively, the eye opening value may represent one or more measurements obtained from an eye diagram. For example, the eye opening value may take into consideration one or more of: the eye amplitude, the eye crossing amplitude, the eye crossing percentage, the eye height, the eye width as well as other factors. The specific formula for calculating the eye opening value based on such measurements may vary without departing from the spirit and scope of the present disclosure.

The method 200 for optimizing floating tap positions in a DFE in accordance with the present disclosure eliminates the need for costly equipment and test setups. The method 200 may be conducted on any system within its protocol constraints. The method 200 allows each channel (of the receiver) to be optimized at the time of initialization or initial receiver training. This means that if the channel changes from one power cycle to the next, the system may still remain optimized without the need for an operator. In addition, the optimal distribution configuration may be stored for further references. In this manner, the optimization process may only need to be conducted when system level changes have occurred. Furthermore, the optimal position information of the floating taps identified in method 200 may also be utilized by system designers to determine the location of possible discontinuities, or identify locations where improvements in the design may be made.

It is contemplated that the method 200 in accordance with the present disclosure may be implemented in forms of a software/firmware package, which may be utilized in a system without requiring any hardware changes. Alternatively, for custom applications and/or if protocol changes are allowed, the method 200 in accordance with the present disclosure may be incorporated directly into the hardware and implemented as a part of an embedded system or a stand-alone system.

Figure 3:
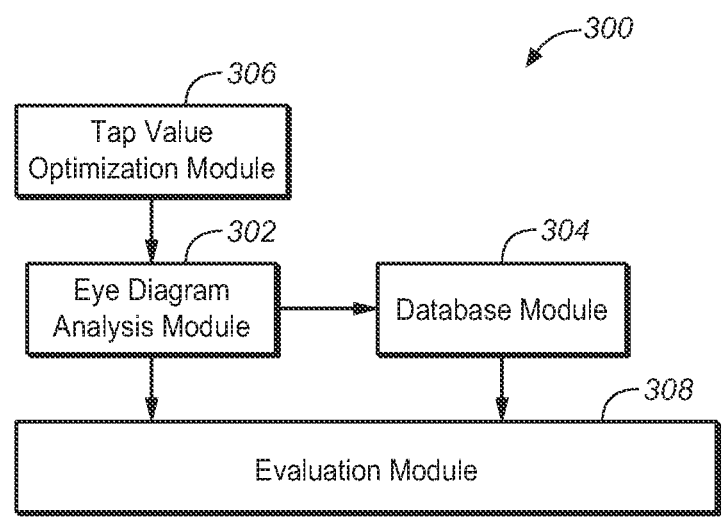
FIG. 3 is a block diagram illustrating a system for optimizing floating tap positions in a DFE.

Referring to FIG. 3, a block diagram illustrating a system 300 for optimizing floating tap positions in a DFE is shown. The system 300 may include an eye diagram analysis module 302 configured for providing statistically sampled eye diagrams after the application of receiver equalization. In one embodiment, the eye diagram analysis module 302 may obtain a baseline eye opening value with the floating taps disabled. The eye diagram analysis module 302 may also obtain an eye opening value for each of the potential floating tap distribution configurations.

The potential floating tap distribution configurations may be specified by a system operator or stored in a database module 304 (e.g., as preconfigured candidates). The eye diagram analysis module 302 may obtain an eye opening value when the floating taps are enabled and positioned according to each particular distribution configuration. In one embodiment, a tap value optimization module 306 is utilized to determine the values of each of the taps (including floating taps and fixed taps) when the floating taps are distributed according to a particular candidate distribution. Once the tap values are determined, the eye diagram analysis module 302 may then obtain the eye opening value for this particular candidate distribution. It is contemplated that various techniques/routines may be utilized to determine the tap values without departing from the spirit and scope of the present disclosure.

Once the eye opening value corresponding to each of the candidate distribution configurations is obtained, an evaluation module 308 may compare each eye opening value against the baseline eye opening value in order to identify the optimal distribution configuration. As described above, the optimal configuration may be identified as one of the candidate distribution configurations that provided the largest improvement in the eye opening value (in comparison with the baseline value). However, if no improvement is observed, then disabling the floating taps may be deemed as the optimal configuration. It is contemplated that the optimal configuration may be recorded in the database module 304 for further references.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A receiver, comprising: a decision feedback equalizer, DFE, wherein the DFE includes at least one fixed tap and a group of floating taps; and a processing module configured to determine floating tap positions in the DFE, wherein the processing module is configured to: obtain a baseline eye opening value for the receiver when the group of floating taps is disabled and when tap value of the at least one fixed tap is optimized; provide a plurality of floating tap distribution configurations, wherein each one of the plurality of floating tap distribution configurations specifying a distribution configuration for the group of floating taps within the DFE; obtain a plurality of eye opening values for the receiver, wherein each particular eye opening value of the plurality of eye opening values corresponding to a particular floating tap distribution configuration of the plurality of floating tap distribution configurations and wherein the particular eye opening value is obtained when the group of floating taps are distributed within the DFE according to the particular floating tap distribution configuration and tap values of the group of floating taps are optimized for this particular floating tap distribution configuration; compare each of the plurality of eye opening values against the baseline eye opening value; determine whether there exists a floating tap distribution configuration that provides a largest eye opening improvement compare to the baseline eye opening value and identify said floating tap distribution configuration as an optimal floating tap distribution configuration; and identify a none-distribution configuration as the optimal floating tap distribution configuration when said floating tap distribution configuration that provides the largest improvement in eye opening value compare to the baseline eye opening value does not exist.

2. The receiver of claim 1, wherein the none-distribution configuration disables the group of floating taps in the DFE.

3. The receiver of claim 1, wherein the processing module is further configured to: store the optimal floating tap distribution configuration.

4. The receiver of claim 1, wherein the optimal floating tap distribution configuration is identified for each communication channel of the receiver during receiver initialization.

5. A method, comprising: determining floating tap positions in a decision feedback equalizer (DFE) of a receiver, wherein the floating tap positions are determined based on steps of: providing a group of floating taps for the DFE, wherein the DFE further includes at least one fixed tap; obtaining a baseline eye opening value for the receiver when the group of floating taps is disabled and when tap value of the at least one fixed tap is optimized; providing a plurality of floating tap distribution configurations, wherein each one of the plurality of floating tap distribution configurations specifying a distribution configuration for the group of floating taps within the DFE; obtaining a plurality of eye opening values for the receiver, wherein each particular eye opening value of the plurality of eye opening values corresponding to a particular floating tap distribution configuration of the plurality of floating tap distribution configurations and wherein the particular eye opening value is obtained when the group of floating taps are distributed within the DFE according to the particular floating tap distribution configuration and tap values of the group of floating taps are optimized for this particular floating tap distribution configuration; comparing each of the plurality of eye opening values against the baseline eye opening value; determining whether there exists a floating tap distribution configuration that provides a largest eye opening improvement compare to the baseline eye opening value and identifying said floating tap distribution configuration as an optimal floating tap distribution configuration; and identifying a none-distribution configuration as the optimal floating tap distribution configuration when said floating tap distribution configuration that provides the largest improvement in eye opening value compare to the baseline eye opening value does not exist.

6. The method of claim 5, wherein the none-distribution configuration disables the group of floating taps in the DFE.

7. The method of claim 5, further comprising:
storing the optimal floating tap distribution configuration.

8. The method of claim 5, wherein the optimal floating tap distribution configuration is identified for each communication channel of the receiver during receiver initialization.

9. A system, comprising: a database module, the database module configured to determine floating tap positions in a decision feedback equalizer (DFE) of a receiver and to provide a plurality of distribution configurations for a group of floating taps in the DFE, wherein the DFE further includes at least one fixed tap; an eye diagram analysis module, the eye diagram analysis module configured to obtain a baseline eye opening value for the receiver when the group of floating taps is disabled and when tap value of the at least one fixed tap is optimized, the eye diagram analysis module further configured to obtain a plurality of eye opening values for the receiver, wherein each particular eye opening value of the plurality of eye opening values corresponding to a particular distribution configuration of the plurality of distribution configurations and wherein the particular eye opening value is obtained when the group of floating taps are distributed in the DFE according to the particular distribution configuration and tap values of the group of floating taps are optimized for this particular floating tap distribution configuration; and an evaluation module, the evaluation module configured to compare each of the plurality of eye opening values against the baseline eye opening value, the evaluation module further configured to determine whether there exists a floating tap distribution configuration that provides a largest eye opening improvement compare to the baseline eye opening value, identify said floating tap distribution configuration as an optimal floating tap distribution configuration when said floating tap distribution configuration that provides the largest improvement in eye opening value compare to the baseline eye opening value exists, and identify a none-distribution configuration as the optimal floating tap distribution configuration when said floating tap distribution configuration that provides the largest improvement in eye opening value compare to the baseline eye opening value does not exist.

10. The system of claim 9, wherein the none-distribution configuration disables the group of floating taps in the DFE.

11. The system of claim 9, wherein the evaluation module is further configured to store the optimal floating tap distribution configuration in the database module.

12. The system of claim 9, wherein the optimal floating tap distribution configuration is identified for each communication channel of the receiver during receiver initialization.

* * * * *